US010804806B1

(12) United States Patent
Finkel et al.

(10) Patent No.: US 10,804,806 B1
(45) Date of Patent: Oct. 13, 2020

(54) METHOD AND SYSTEM OF A SWITCHING POWER CONVERTER

(71) Applicant: SEMICONDUCTOR COMPONENTS INDUSTRIES, LLC, Phoenix, AZ (US)

(72) Inventors: Alan David Finkel, Chandler, AZ (US); John D. Stone, Tempe, AZ (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/666,669

(22) Filed: Oct. 29, 2019

Related U.S. Application Data

(60) Provisional application No. 62/886,639, filed on Aug. 14, 2019.

(51) Int. Cl.
*H02M 3/335* (2006.01)
*H02M 1/00* (2006.01)

(52) U.S. Cl.
CPC .................. *H02M 3/33507* (2013.01); *H02M 2001/0009* (2013.01)

(58) Field of Classification Search
CPC ............. H02M 3/335; H02M 3/33507; H02M 3/33523; H02M 3/33569; H02M 2001/0003; H02M 2001/0009; H02M 2001/0025
See application file for complete search history.

(56) References Cited

U.S. PATENT DOCUMENTS 9,065,427 B2 * 6/2015 Kleinpenning .... H03K 5/00006
2012/0194227 A1 * 8/2012 Lin .................. H02M 3/33507 327/113
2015/0029763 A1 1/2015 Shen et al.
2017/0373589 A1 12/2017 Saint-Pierre et al.
2019/0116637 A1 * 4/2019 Wang ...................... H03K 5/24
(Continued)

OTHER PUBLICATIONS

Fairchild Semiconductor Corporation, "FAN602 Offline Quasi-Resonant PWM Controller," Application data sheet for power converter primary-side controller, Jun. 2016.
(Continued)

*Primary Examiner* — Matthew V Nguyen
(74) *Attorney, Agent, or Firm* — Dickinson Wright PLLC; Mark E. Scott

(57) ABSTRACT

A switching power converter. Example methods include: switching a primary switch of the converter at a switching frequency, the converter having a feedback circuit acting as a low pass filter with a cutoff frequency, and each cycle of the switching frequency including a discharge mode and a charge mode that ends at a peak current through a primary winding of a transformer; generating, during the switching, a jitter signal having a shape and a jitter frequency; and ending a plurality of consecutive charge modes at a plurality of respective peak current values of current through the primary winding, the plurality of peak current values define an average value, and where peak current values higher than the average value define an envelope in the shape of the jitter signal, and peak current values lower than the average value define an envelope in the shape of the jitter signal that is inverted.

20 Claims, 8 Drawing Sheets

(56) References Cited

U.S. PATENT DOCUMENTS

2020/0106368 A1* 4/2020 Chen ................ H02M 3/33507

OTHER PUBLICATIONS

On Semiconuctor, "NCP1339—High-Voltage, Quasi-Resonant Controller Featuring Valley Lock-Out and Power Savings Mode," Application data sheet for power converter primary-side controller, Feb. 2017.

On Semiconuctor, "NCP1340—High-Voltage, Quasi-Resonant Controller Featuring Valley Lock-Out Switching," Application data sheet for power converter primary-side controller, Jun. 2018.

On Semiconuctor, "NCP1342—High-Voltage Quasi-Resonant Flyback Controller," Application data sheet for flyback power converter, Mar. 2019.

* cited by examiner 100
110
112
120
130
132
134
136
140
150
160
162
164
166
170
172
174
175
176
177
178
179
180
181
185
186
188
102
104
LOAD
$V_{OUT}$
$V_{IN}$
GATE
CONTROLLER
190
ZCD
FB
CS

METHOD AND SYSTEM OF A SWITCHING POWER CONVERTER

CROSS-REFERENCE TO RELATED APPLICATIONS

None.

BACKGROUND

Switched mode power supplies can be used to create a direct current (DC) voltage from an alternating current (AC) voltage by switching current through an energy storage element such as a transformer. The duty cycle (and/or frequency) of the switching is controlled to regulate the output to a desired level (e.g., an output voltage or output current). Two popular types of isolated switched mode power supplies are forward mode and flyback mode converters.

A flyback converter is based on a transformer arranged for flyback operation. When current is switched through the primary winding, the primary current in the transformer increases, storing energy within the transformer. When the primary switch is opened, a voltage is induced on the secondary winding that forward biases a rectifier. The secondary winding supplies current into the load. A controller varies the on- and off-times of a primary switch in series with the primary winding to regulate the output to a desired level.

A quasi-resonant (QR) flyback converter is a variable switching frequency converter that detects transformer demagnetization and subsequent resonant "valleys" of voltage across the primary switch to determine when the next switching cycle will begin. This operation is therefore a discontinuous conduction mode of operation with the added benefit that the turn-on of the primary switch is synchronized to a valley, which may reduce the power dissipation in the primary switch during the turn-on transition. QR flyback converters may be used in off-line AC-DC consumer applications because they offer a cost effective, isolated conversion with reduced turn-on voltage of the primary switch. However, to maintain good performance of the converter, there are tradeoffs to designing for efficiency including: output ripple noise; stabilization; and electromagnetic interference (EMI).

BRIEF DESCRIPTION OF THE DRAWINGS

For a detailed description of example embodiments, reference will now be made to the accompanying drawings in which.

DEFINITIONS

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

"Controller" shall mean, alone or in combination, individual circuit components, an application specific integrated circuit (ASIC), a microcontroller with controlling software, a digital signal processor (DSP), a processor with controlling software, or a field programmable gate array (FPGA), configured to read inputs and drive outputs responsive to the inputs.

In relation to electrical devices, the terms "input" and "output" refer to electrical connections to the electrical devices, and shall not be read as verbs requiring action. For example, a controller may have a gate output and one or more sense inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

At least some of the example embodiments are directed to methods and systems of operating a quasi-resonant (QR) flyback converter. More particularly, example embodiments create or effectively implement a modified jitter signal that has attributes of a jitter signal with a jitter frequency below a cutoff frequency of a feedback loop that behaves like a low-pass filter. However, the modified jitter signal has an effective frequency above the cut-off frequency of the feedback loop such that the implemented jitter does not manifest itself in the output voltage. The actual or effective modified jitter signal may help reduce electromagnetic interference (EMI) in the quasi-resonant flyback converter. The specification now turns to an example flyback converter in accordance with example embodiments.

Figure 1:
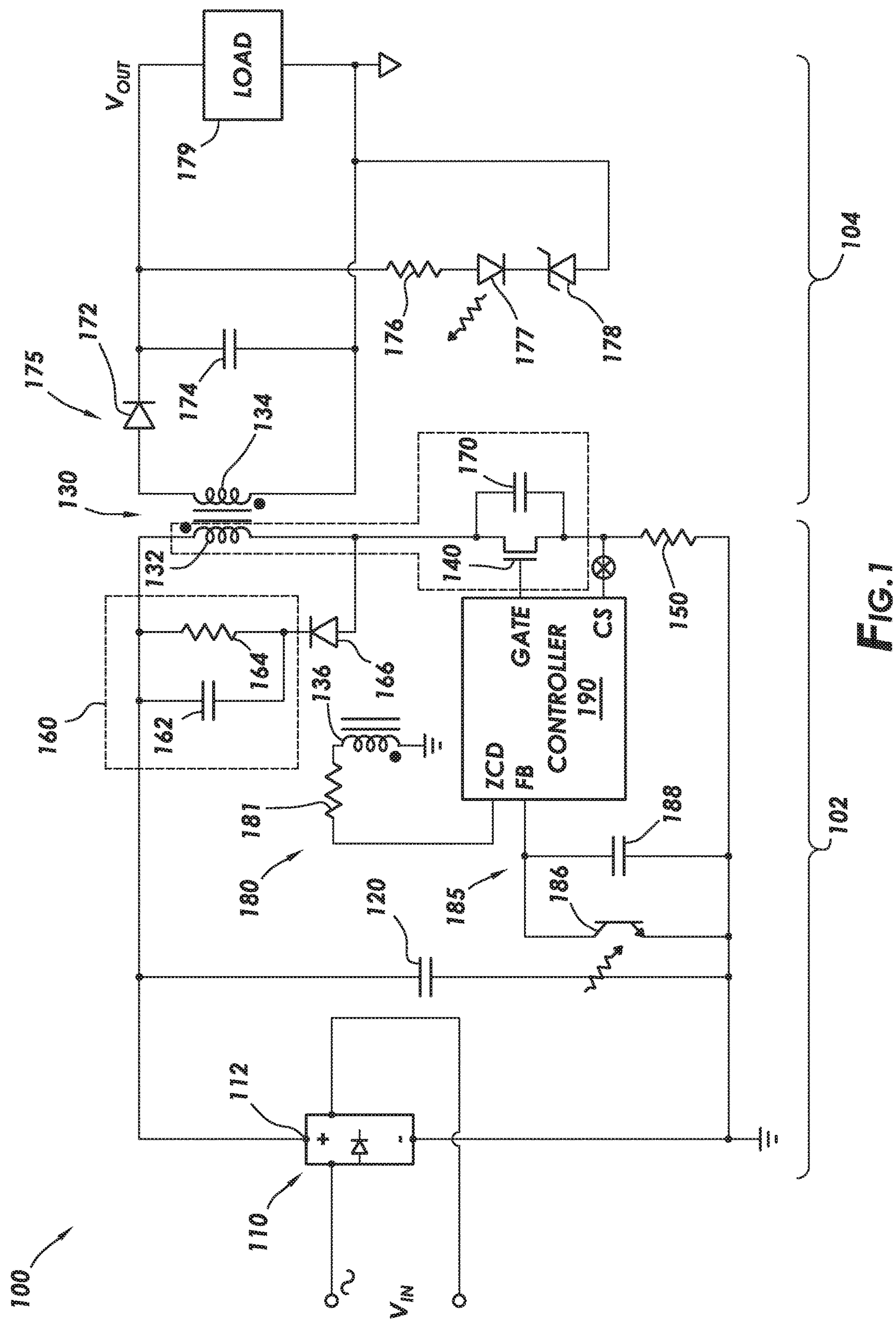
FIG. 1 shows a quasi-resonant flyback (QR) converter with jitter, in accordance with at least some embodiments.

FIG. 1 shows in partial schematic and partial block diagram from a QR converter in accordance with at least some embodiments. The QR converter 100 (hereafter just "converter 100") comprises a primary side 102 galvanically isolated from secondary side 104 by way of a transformer 130. The converter 100 includes a bridge rectifier 110, an input capacitor 120, the transformer 130, a primary field effect transistor (FET) 140, a current sense resistor 150, a snubber circuit 160, a resonant tank capacitor 170, a secondary circuit 175, a voltage feedback circuit 185, and a primary-side controller (hereafter just "controller 190"). Each will be addressed in turn.

Bridge rectifier 110 is illustrated in block diagram form and can include an arrangement of one or more diodes in a bridge circuit configuration that rectifies an alternating current (AC) input voltage VIN. The bridge rectifier 110 produces a rectified AC waveform that is output at signal node 112. For example, the bridge rectifier 110 may provide a full-wave rectified AC waveform and the input capacitor 120 smooths the waveform. Input capacitor 120 has a first terminal connected to the signal node 112 of the bridge rectifier 110, and a second terminal connected to primary ground.

Transformer 130 has a primary winding 132, a secondary winding 134, and an auxiliary winding 136. Primary winding 132 has a first end connected to the signal node 112, and a second end. Secondary winding 134 has a first end, and a second end connected to a secondary ground. Auxiliary winding 136 has a first end, and a second end connected to primary ground.

The example power converter has a primary switch illustrative shown as the primary FET 140. Other primary switches (e.g., junction transistors) may also be used. The example primary FET 140 defines a drain connected to the second end of the primary winding 132, a gate, and a source. Current sense resistor 150 has a first terminal connected to the source of primary FET 140, and a second terminal connected to primary ground.

Snubber circuit 160 includes a capacitor 162, a resistor 164, and a diode 166. Capacitor 162 has a first terminal connected to the signal node 112, and a second terminal. Resistor 164 has a first terminal connected to the signal node 112 and a second terminal connected to the second terminal of the capacitor 162. Diode 166 is a PN junction diode having an anode connected to the second end of the primary winding 132, and a cathode connected to the second terminals of capacitor 162 and resistor 164. At the end of each charge mode (discussed more below), inductor current from the primary winding 132 may be snubbed into the snubber circuit 160.

The primary FET 140, by virtue of its design and construction, has a parasitic capacitance between its drain and source, and in certain operating conditions (discussed more below) the parasitic capacitance oscillates with inductances on the primary side 102 of the circuit. The parasitic capacitance of the primary FET 140 is illustrated as a capacitor 170 having a first terminal connected to the second end of primary winding 132 and the drain of the primary FET 140, and a second terminal connected to the source of primary FET 140.

Secondary circuit 175 includes a diode 172 (or secondary-side rectifier), an output capacitor 174, a resistor 176, a photodiode 177, a Zener diode 178, and a load 179. Diode 172 has an anode connected to the first end of secondary winding 134, and a cathode for providing an output voltage labeled "$V_{OUT}$". In other cases, the diode 172 is replaced with an active, synchronous rectifier, such as a FET controlled by a secondary side controller. Output capacitor 174 has a first terminal connected to the cathode of diode 172, and a second terminal connected to secondary ground.

In order to regulate the output voltage $V_{OUT}$, the output voltage is sensed on the secondary side by way of resistor 176, photodiode 177, and Zener diode 178. In particular, resistor 176 has a first terminal connected to the cathode of diode 172 and the first terminal of output capacitor 174, and a second terminal. Photodiode 177 has an anode connected to the second terminal of resistor 176, and a cathode. Zener diode 178 has a cathode connected to the cathode of photodiode 177, and an anode connected to secondary ground.

Returning to the primary side of the power converter, Zero Crossing Detection (ZCD) circuit 180 includes a resistor 181. Resistor 181 has a first terminal connected to the first end of auxiliary winding 136, and a second terminal. The example controller 190 has an input terminal labeled "ZCD" ("ZCD" terminal) connected to the second terminal of the resistor 181.

The voltage feedback circuit 185 is coupled to the output node of the converter 100 (e.g., "$V_{OUT}$") and also coupled to the feedback terminal ("FB") of the controller 190. Voltage feedback circuit 185 includes a phototransistor 186 and a capacitor 188. Phototransistor 186 has a collector, a base optically coupled to the photodiode 177, and an emitter connected to the primary ground. The photodiode 177 and the phototransistor 186 are collectively part of an optocoupler. Capacitor 188 has a first terminal connected to the collector of phototransistor 186 and a second terminal connected to primary ground.

The example controller 190 further includes a feedback terminal labeled "FB" ("FB" terminal) connected to the voltage feedback circuit 185. The controller 190 also includes a current sense terminal labeled "CS" connected to the first terminal of current sense resistor 150, and gate terminal labeled "GATE" connected to the gate of primary FET 140.

During operation, the example converter 100 provides AC-DC conversion with low noise by switching the primary FET 140 within voltage valleys detected in oscillations of the drain voltage. The resonant tank used for valley switching in a QR flyback is formed by the magnetizing inductance of primary winding 132 and a "lump" capacitance of the primary FET 140 illustrated in FIG. 1 as a capacitor 170. The "lump" capacitance includes the parasitic capacitance at the drain of primary FET 140 including the primary FET output capacitance ($C_{OSS}$) and, in some embodiments, a discrete capacitor to tune the resonance.

A switching cycle of the converter 100 may be conceptually broken down into two modes, a charge mode and a discharge mode. When the controller 190 asserts the gate terminal, a voltage is applied to the gate of the primary FET 140 which in turn enables current to conduct through the primary winding 132, and thereby energy is stored in transformer 130. During the time the controller 190 asserts the gate terminal, the converter 100 is in the charge mode.

During the charge mode, current flows through the primary winding 132, but not the secondary winding 134 because during the charge mode the secondary rectifier, here in the example form of diode 172, is reversed biased. The energy is stored in the field of the primary winding 132.

When the controller 190 de-asserts the gate terminal, the voltage on the gate of the primary FET 140 drops below the threshold voltage of the gate, the primary FET 140 becomes non-conductive, and the converter 100 enters the discharge mode. During the discharge mode, the polarity of the voltage on the secondary winding 134 reverses, which forward biases the diode 172 and thus current flows to the output capacitor 174 and the load 179.

The voltage feedback circuit 185 ("feedback circuit") develops a feedback signal on the FB terminal of controller 190. In particular, photodiode 177 produces photons at a rate proportional to the output voltage $V_{OUT}$. In turn, the phototransistor 108 becomes more or less conductive as a function of the number of photons produced. Because of the presence of the capacitor 188, the voltage feedback circuit 185 implements a low pass filter with a cutoff frequency (e.g., the half-power point, or 3 dB point). In some example cases, the cutoff frequency of the voltage feedback circuit 185 may be 500 Hz to 5 kHz.

The ZCD feedback circuit 180 provides a ZCD signal on the ZCD terminal on the controller 190. In order to perform QR turn-on of the primary FET 140 the controller 190 detects a valley of the resonance occurring between the magnetizing inductance of the transformer 130 and the capacitor 170. That is, during a discharge mode when the field of the transformer has collapsed, a resonance occurs between the magnetizing inductance of the transformer 130 and the capacitor 170 (e.g., creating peaks and valleys). The voltage across the auxiliary winding 136 coupled to the ZCD terminal reflects the oscillations in the primary winding 132 and a signal at the ZCD terminal enables the controller 190 to identify a "valley", e.g., a low voltage point in the resonance. Upon detecting the "valley", the controller 190 switches on the primary FET 140 to begin the next charge mode.

Controller 190 asserts the gate terminal and controls when to turn on the primary FET 140 using techniques described here. In one embodiment, the controller 190 determines the pulse width and operating frequency of the gate signal based on a current sense signal CS, the ZCD signal, and feedback signal FB.

One of the drawbacks of a switching power converter is electrical noise. That is, the current and voltage through the transformer 130 generate electromagnetic interference (EMI) fields that are filtered in order to meet various EMI standards set by industry. One solution to reducing an EMI profile of the converter includes introducing a jitter signal during either the charge mode or the discharge mode.

Because of the variable frequency nature of QR flyback converters, jitter signals introduced during the charge mode face various challenges due to the voltage feedback circuit 185 behaving as a low-pass filter. A jitter signal that passes through the voltage feedback circuit 185 may be effectively cancelled out by the feedback loop adjusts. Jitter signals higher than the cutoff frequency for the feedback loop may be less effective at reducing EMI.

In some solutions, the frequency of a jitter signal introduced during the charge mode is increased to avoid the effects of the low-pass filter. However, such solutions do not work well as a higher jitter frequency does not provide as much benefit for EMI, and reducing the loop regulation bandwidth is not practical for many switched mode power supplies (SMPS) such as the QR flyback converter.

In accordance with example embodiments, a switching frequency of the primary FET 140 is impacted by a modified jitter signal that may be actually or effectively created. In one embodiment, the controller 190 generates a pulse signal having a pulse frequency greater than the cutoff frequency of the feedback circuit, and the controller 190 generates a jitter signal having a shape and a jitter frequency below the cutoff frequency of the feedback circuit. The controller 190 actually or effectively amplitude modulates the pulse signal with the jitter signal to create the modified jitter signal applied during the operation of the converter 100 to help reduce the EMI profile of the converter 100.

Figure 2A:
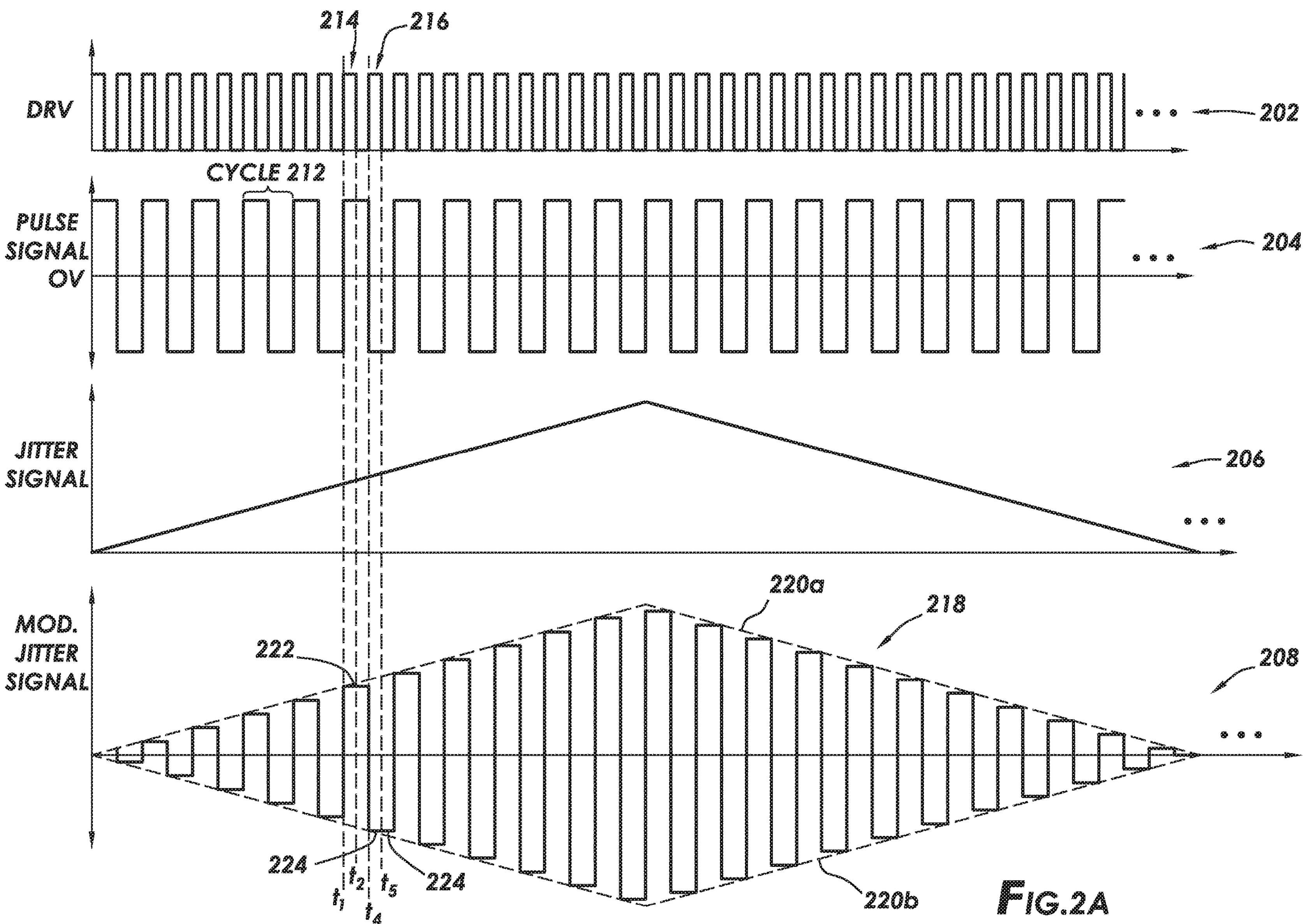
FIG. 2A shows timing diagrams, in accordance with at least some embodiments.
Figure 2B:
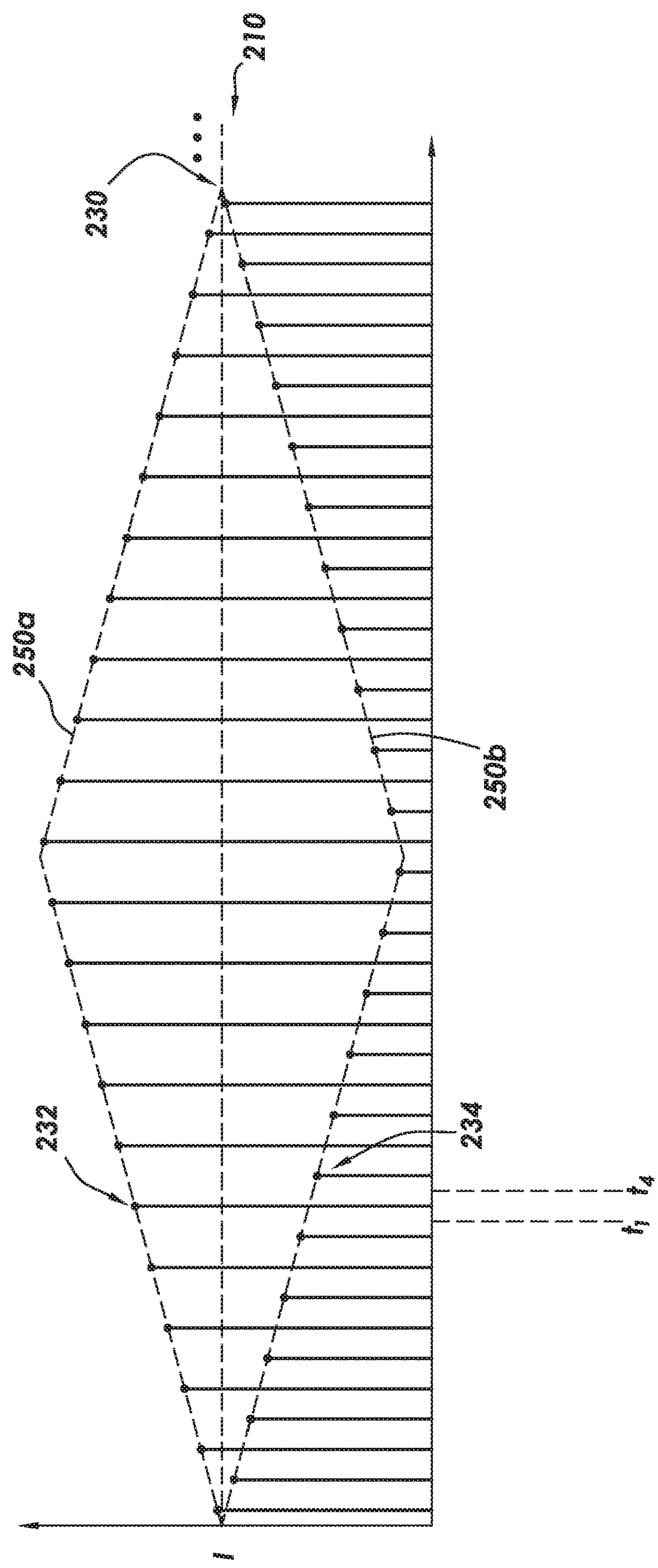
FIG. 2B shows timing diagrams, in accordance with at least some embodiments.

FIG. 2 (comprising FIGS. 2A and 2B) illustrates timing diagrams in accordance with at least some embodiments. The time scale in FIG. 2 is not necessarily to scale. In particular, FIG. 2 shows several signals plotted on corresponding time axis, including plot 202 showing an example drive (DRV) signal, plot 204 showing an example pulse signal, plot 206 showing an example jitter signal, plot 208 showing an example modified jitter signal, and plot 210 showing a plurality of example peak current values of current through the primary winding through the course of a plurality of consecutive charge modes.

The timing diagram of FIG. 2 illustrates a modified jitter signal over several charge modes. In particular, plot 202 illustrates a nominal DRV signal, where an assertion of the DRV signal results in assertion of the GATE terminal of the controller 190 (FIG. 1). For example, the DRV signal is asserted at time t1 and de-asserted at time t2. The time period defined by t1 and t2 is one example charge mode (e.g., charge mode 214). A consecutive charge mode begins at time t4, when the DRV signal is once again asserted.

Plot 204 illustrates a modulating or pulse signal in accordance with various embodiments. The example pulse signal is a square wave with a frequency that is half of a frequency of the DRV signal. The example square wave has both positive and negative components or peaks, and is centered at zero volts. Accordingly, for a single period of the example pulse signal, half of the square wave has a positive value, while half of the square wave has a negative value. The designations as "positive" or "negative" are arbitrary, but selected to describe a relationship between two parts of the pulse signal and used consistently to avoid confusion. The pulse signal illustrated in plot 204 is merely one example and is not meant to be limiting. Any periodic waveform may be used. That is, other pulse signals are contemplated that vary in shape, amplitude, and frequency. Furthermore, the techniques described herein equally apply to waveforms that are not periodic.

In accordance with example embodiments, the pulse signal has a frequency that is lower than the switching frequency of the controller 190 (e.g., lower than the DRV signal of plot 202) but higher than the cutoff frequency of the voltage feedback circuit 185 (FIG. 1). That is, a lower bound of frequencies of the pulse signal is defined by an upper cut-off frequency of the feedback loop.

The example jitter signal in plot 206 is a triangle wave with a period that spans several charge modes. Thus, the frequency of the jitter signal is lower than that of the pulse signal. In various embodiments, the frequency of the jitter signal is below the cutoff frequency of the voltage feedback circuit 185 (FIG. 1). That is, given the lower frequency of the jitter signal, the jitter signal in plot 206 would be detected by or pass through the feedback loop behaving as a low-pass filter.

The jitter signal in plot 206 is one example of a jitter signal and is not meant to be limiting. Other jitter signals are contemplated that vary in shape, amplitude, and frequency. In example embodiments, the jitter signal can have any frequency, including frequencies well within a detectable bandwidth (e.g., below the cutoff frequency) of the feedback loop that behaves as a low-pass filter.

In accordance with various embodiments, and conceptually, the jitter signal in plot 206 is modulated by the pulse signal in plot 204 to create the modified jitter signal 218 in plot 208. In one example, the modified jitter signal 218 is created by amplitude modulating the pulse signal (plot 204) with the jitter signal (plot 206). The modified jitter signal 218 has both positive and negative components. Similar to the pulse signal, the designations as "positive" or "negative" are arbitrary, but selected to describe a relationship between two adjacent parts of the modified jitter signal and used consistently to avoid confusion.

The actual or conceptual modulation of the pulse single creates a waveform envelope 220_a_ and 220_b_ that tracks a shape of the jitter signal in plot 206. In particular, waveform envelope 220_a_ tracks the jitter signal in shape and polarity, while the waveform envelope 220_b_ tracks the jitter signal in shape but has an opposite polarity (e.g., waveform envelope 220_b_ is an inverted triangle wave). A frequency of either waveform envelope 220_a_ or 220_b_ tracks the frequency of the jitter signal.

During the example charge mode 214, a first portion 222 of the modified jitter signal 218 has a first amplitude and a first polarity. The peak current through the primary winding 132 (FIG. 1) is controlled by the first amplitude and the first polarity. In the example charge mode 214, the pulse signal has a positive polarity between times t1 and t2, and the modified jitter signal tracks an amplitude of the jitter signal between times t1 and t2.

During a consecutive charge mode 216 (e.g., occurring between times t4 and t5), a second portion 224 of the modified jitter signal 218 has a second amplitude and a second polarity. The peak current through the primary winding 132 (Figured 1) in the second charge mode 216 is controlled by the second amplitude and the second polarity. In the example charge mode 216, the pulse signal has a negative polarity between times t4 and t5, and the modified jitter signal tracks an amplitude of the jitter signal between times t4 and t5. Stated otherwise, the instantaneous absolute value of the second polarity tracks the instantaneous value of the jitter signal.

An actual implementation of the modified jitter signal can occur in several ways. Example implementations are shown in FIGS. 3, 4, 5, and 6, and discussed more below. The actual or effective modified jitter signal 218 modifies the peak current through the primary winding during each charge mode. For purposes of discussion of FIG. 2, consider that, conceptually, the modified jitter signal changes a current setpoint of a charge mode. Because of the relationship of the frequency of the DRV signal and pulse signal, during a first charge mode 214 the effect of the change is to increase a current setpoint by the amplitude of the jitter signal, and in an immediately subsequent charge mode 216 the effect of the change is to decrease a current setpoint by the amplitude of the jitter signal.

An effect of implementing the modified jitter signal is illustrated in plot 210. Specifically, a plurality of peak current values occurring in respective consecutive charge modes are shown along the Y-axis. A first subset of the peak current values define a first envelope 250_a_ in the shape of the jitter signal (plot 206), that mirrors or is the same as the polarity and amplitude of the jitter signal. A second subset of the peak current values define a second envelope 250_b_, also in the shape of the jitter signal (plot 206), however the second envelope is inverted—that is, the second envelope has a polarity opposite a polarity of the jitter signal.

A dotted line running between the first and second envelopes defines an average value 230 of the plurality of peak current values. Described with respect to the average value 230, the peak current values higher than the average value 230 define the first envelope 250_a_, while the peak current values lower than the average value 230 define the second envelope 250_b_.

Specifically, the vertical lines illustrated in plot 210 represent a peak current value through the primary winding 132 during respective charge modes. For example during charge mode 214 (plot 202), the peak current value 232 has a value above the average value 230 by an amount based on the modified jitter signal. During example charge mode 216 (plot 202), the peak current value 234 has a value below the average value 230 by an amount based on the modified jitter signal. The actual or conceptual modified current signal creates a dithered current signal, and the dithered current signal impacts the peak current value through the primary winding 132 during each charge mode.

Figure 3:
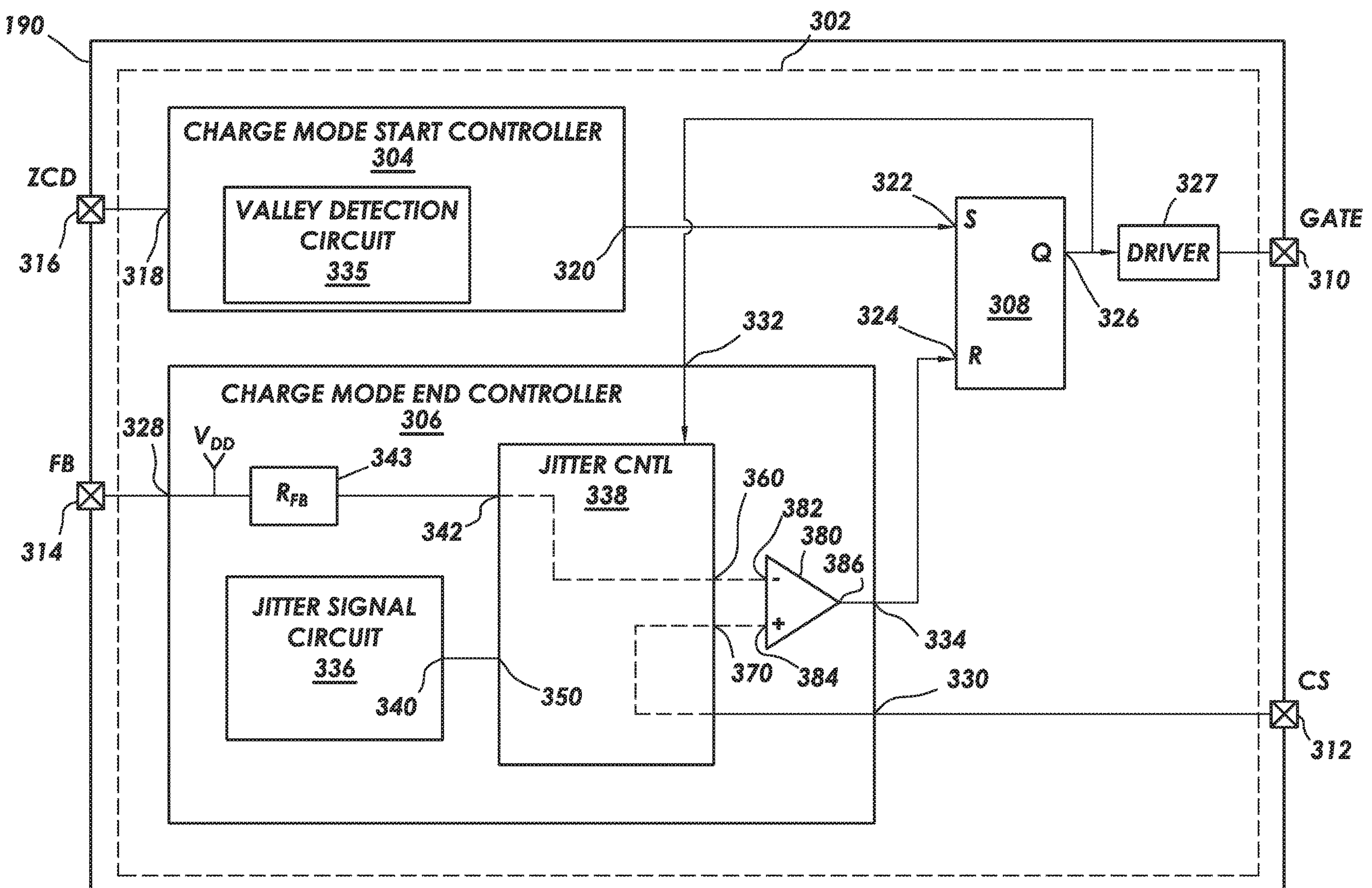
FIG. 3 shows a block diagram of a controller configured to implement jitter during a charge mode, in accordance with at least some embodiments.

FIG. 3 shows a block diagram of a controller 190 in accordance with at least some embodiments. In particular, the controller 190 may comprise one more electrical devices monolithically created on a substrate 302 and encapsulated within packaging; however, the functionality of the controller 190 may be embodied on multiple substrates co-packaged and electrically coupled to each other and the various terminals. The example packaged integrated circuit (IC) defines the gate terminal 310 ("GATE" in FIG. 1), a current sense terminal 312 ("CS" in FIG. 1), a feedback terminal 314, and a voltage sense terminal 316 ("ZCD" in FIG. 1).

The functionality of the controller 190 may be conceptually, though not necessarily physically, divided into a charge mode start controller 304 (hereafter just "start controller 304"), a charge mode end controller 306 (hereafter just "end controller 306"), and a latch circuit 308. The example start controller 304 defines a sense input 318 coupled to the voltage sense terminal 316, and a start output 320.

The example latch circuit 308 defines a latch input 322 coupled to the start output 320. The latch circuit 308 further defines a reset input 324 and a drive output 326 coupled to the gate terminal 310. In some embodiments, the drive output 326 is coupled to the gate terminal 310 by way of a driver circuit 327.

The start controller 304 comprises a valley detection circuit 335. During each discharge mode, the valley detection circuit 335 is configured to detect a "valley" in the voltage oscillations across the primary FET 140 (FIG. 1) caused by resonance between the primary winding 132 (FIG. 1) and the capacitance represented by capacitor 170. When an appropriate valley is detected, the start controller 304 asserts the start output 320. An assertion of the start output 320 causes an assertion at the latch input 322, which in turn propagates an assertion of the gate terminal 310. Accordingly, the start controller 304 is configured to assert the gate terminal 310 at a switching frequency to create a plurality of consecutive charge modes.

The example end controller 306 defines: a current sense input 330 coupled to the current sense terminal 312; a gate input 332 coupled to the drive output 326; a reset output 334 coupled to the reset input 324 of the latch circuit 308; and a feedback input 328 coupled to the feedback terminal 314. The end controller 306 is configured to end a plurality of consecutive charge modes at a respective plurality of sensed current values or signals. The sensed current values are sensed by way of the current sense terminal 312 coupled to the current sense input 330. The plurality of sensed current values define an average value where some of the sensed current values are higher than the average value, and some of the sensed current values are lower than the average value, similar to the description in plot 210. The sensed current values that are higher than the average value define an envelope in the shape of the jitter signal, while the sensed current values that are lower than the average value define an envelope in the shape of the jitter signal that is inverted.

The example end controller 306 is configured to generate a jitter signal having a shape and a jitter frequency. In one example, the jitter signal has a shape of a triangle wave and a jitter frequency that is lower than the switching frequency. In order to generate the jitter signal, the example end controller 306 further includes a jitter signal circuit 336. The jitter signal circuit 336 defines a jitter output 340, and the jitter signal circuit 336 is configured to drive the jitter signal with the shape and jitter frequency onto the jitter output 340.

The example jitter controller 338 defines the gate input 332, the current sense input 330, a current setpoint input 342 coupled to the feedback terminal 314 (possibly through a feedback network $R_{FB}$ 343), a jitter input 350 coupled to the jitter output 340, and the current sense input 330 coupled to the current sense terminal 312. The jitter controller 338 further defines a dithered setpoint output 360 and a dithered sense output 370.

The example end controller 306 also defines a comparator 380 that includes a first input 382 coupled to the dithered setpoint output 360, a second input 384 coupled to the dithered sense output 370, and a compare output 386 coupled to the reset output 334. The reset output 334 is coupled to the reset input 324 of the latch circuit 308. The comparator 380 is configured to compare signals at the first input 382 and the second input 384, and when the signals cross, assert the reset output 334. Assertion of the reset output 334 causes an assertion of the reset input 324, which in turn de-asserts the gate terminal 310. Accordingly, an assertion of the compare output 386 de-asserts the gate terminal 310 and ends a respective charge mode.

The jitter controller 338 can be configured to provide signals to the comparator 380 in various ways. In one example, and as discussed with respect to FIG. 2, the jitter controller 338 modifies a current setpoint signal on the current setpoint input 342 with the modified jitter signal created based on a jitter signal provided to the at the jitter input 350. In another example, the jitter controller 338 modifies a sensed current value on the current sense input 330 with the modified jitter signal. In another example, the jitter controller 338 modifies a sensed current value with the jitter signal in a first charge mode, and modifies the current setpoint signal in a second, consecutive charge mode. Each of these example embodiments are discussed, in turn.

Figure 4:
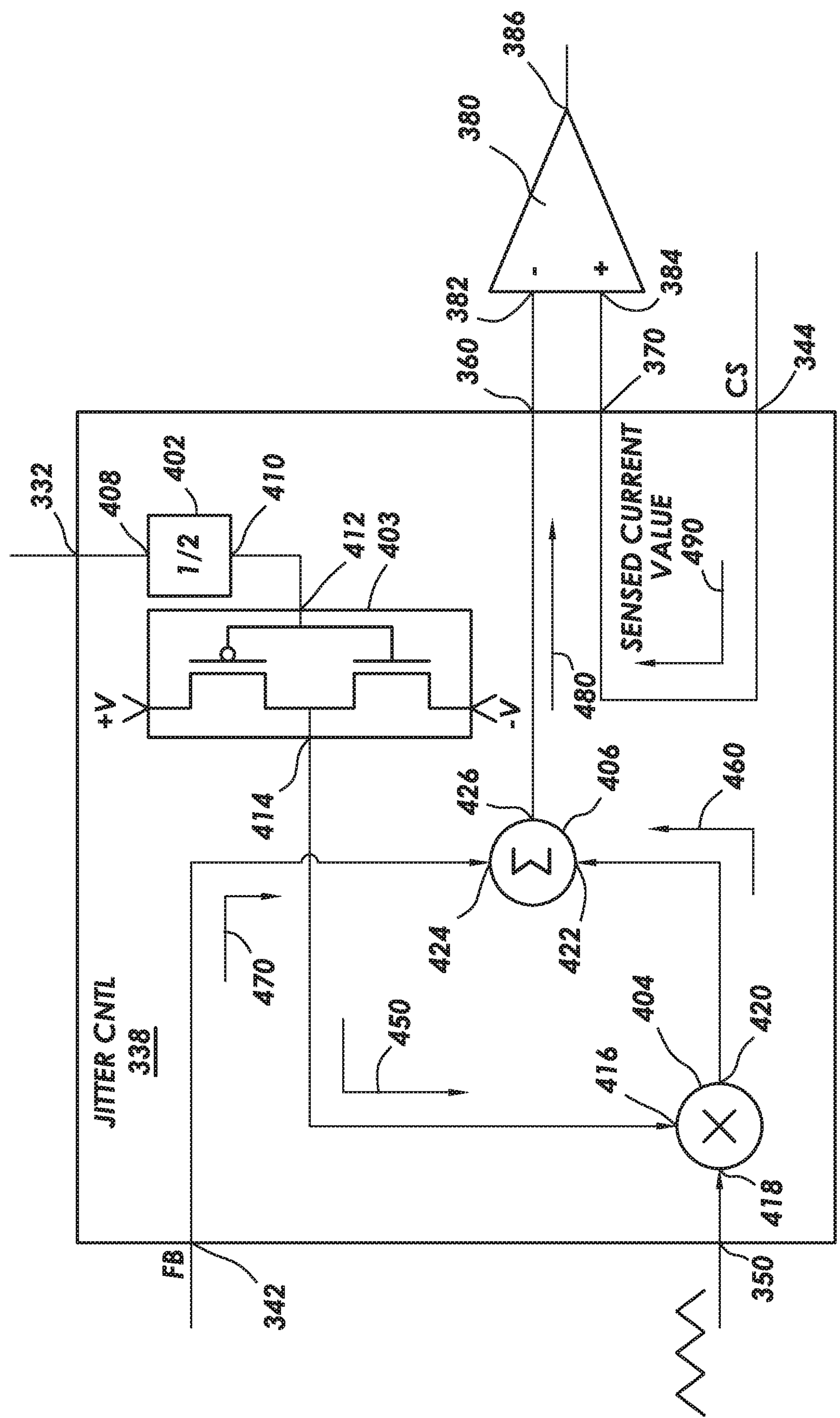
FIG. 4 shows a block diagram of a jitter controller, in accordance with at least some embodiments.

FIG. 4 shows an electrical schematic of a jitter controller 338 in accordance with at least some embodiments. In particular, FIG. 4 shows an example jitter controller 338 along with the comparator 380 to illustrate embodiments where the jitter controller 338 modifies a current setpoint signal with the modified jitter signal to create a dithered setpoint signal. The example jitter controller 338 defines a pulse generator 402, a pulse signal circuit 403, an amplitude modulation node 404, and a summation node 406. The pulse generator 402 further defines a first input 408 coupled to the gate input 332, and a pulse output 410.

The pulse signal circuit 403 has a pulse start input 412 coupled to the pulse output 410, and a pulse output 414. In some embodiments, the pulse signal circuit 403 includes a complimentary metal-oxide semiconductor (CMOS) circuit further defining a p-type MOS (PMOS) having a drain coupled to a drain of an n-type MOS (NMOS), and the drains are coupled to the pulse output 414. The gates of both the PMOS and NMOS are coupled to the pulse start input 412. A source of the PMOS is coupled to a positive voltage source, +V. A source of the NMOS is coupled to a negative voltage source, −V.

The amplitude modulation node 404 defines a pulse input 416 coupled to the pulse output 414, a second input 418 coupled to the jitter input 350, and a modified jitter signal output 420. The summation node 406 defines a first input 422 coupled to the modified jitter signal output 420, a second input 424 coupled to the current setpoint input 342, and an output 426 coupled to the dithered setpoint output 360.

The example jitter controller 338 of FIG. 4 is configured to provide a dithered setpoint signal to the comparator 380. For example, the jitter controller 338 receives a gate signal at the gate input 332 and generates a pulse signal having a pulse frequency lower than the switching frequency, by generating the pulse signal based on the gate signal. In the example jitter controller 338, a frequency of the gate signal is divided in half by the pulse generator 402. The gate signal frequency divided in half is used to create the pulse signal with a pulse frequency that is half of the switching frequency. During a first charge mode, the gate signal is asserted and the pulse output 410 coupled to the pulse start input 412 is asserted (e.g., asserted high). Thus, during the first charge mode a voltage value of +V is provided at the pulse output 414. During a second, consecutive charge mode, the gate signal is again asserted, but the pulse output 410 coupled to the pulse start input 412 is de-asserted (e.g. de-asserted as a low signal or no signal). Thus, during the second, consecutive charge mode, a voltage value of −V is provided at the pulse output 414. Accordingly, the pulse signal circuit 403 generates a pulse signal 450 (e.g., the pulse signal shown on plot 204 of FIG. 2) having a square wave shape, with a pulse frequency that is half the switching frequency.

The pulse signal 450 is provided to the amplitude modulation node 404 (e.g., a multiplication node). The amplitude modulation node 404 amplitude modulates the pulse signal 450 with jitter signal received at the jitter input 350. During the first charge mode, the pulse signal 450 has a first amplitude with a positive polarity; and, the pulse signal 450 is amplitude modulated by a portion of the jitter signal to create a modified jitter signal 460. During the second, consecutive charge mode, the pulse signal 450 has a second amplitude having a negative polarity. Accordingly, in the second charge mode the pulse signal is amplitude modulated with a portion of the jitter signal to further create the modified jitter signal 460 during the second charge mode.

In the example system, the modified jitter signal 460 is provided to the summation node 406. The summation node 406 is configured to add the modified jitter signal 460 to a current setpoint signal 470 on the current setpoint input 342, and create a dithered setpoint signal 480. In the example jitter controller 338 of FIG. 4, the sensed current signal passes unchanged through the jitter controller 338. It follows that the sensed current signal provided on the dithered sense output 370 is not dithered. However, for reasons that will become more clear with respect to other exampled embodiments, the output 370 is nevertheless referred to as the dithered sense output 370.

During each charge mode, the comparator 380 compares a dithered setpoint signal 480 to the sensed current signal 490 on the current sense input 344. When the comparator 380 senses the sensed current signal 490 crossing the dithered setpoint signal 480, the comparator 380 asserts compare output 386, and thus de-asserts the gate terminal 310 and ends the respective charge mode.

Summarizing before continuing, the example jitter controller 338 of FIG. 4 modifies the peak current through the primary winding during each charge mode by creating the modified jitter signal 460, and then continuously adding the modified jitter signal to the current setpoint signal 470.

Figure 5:
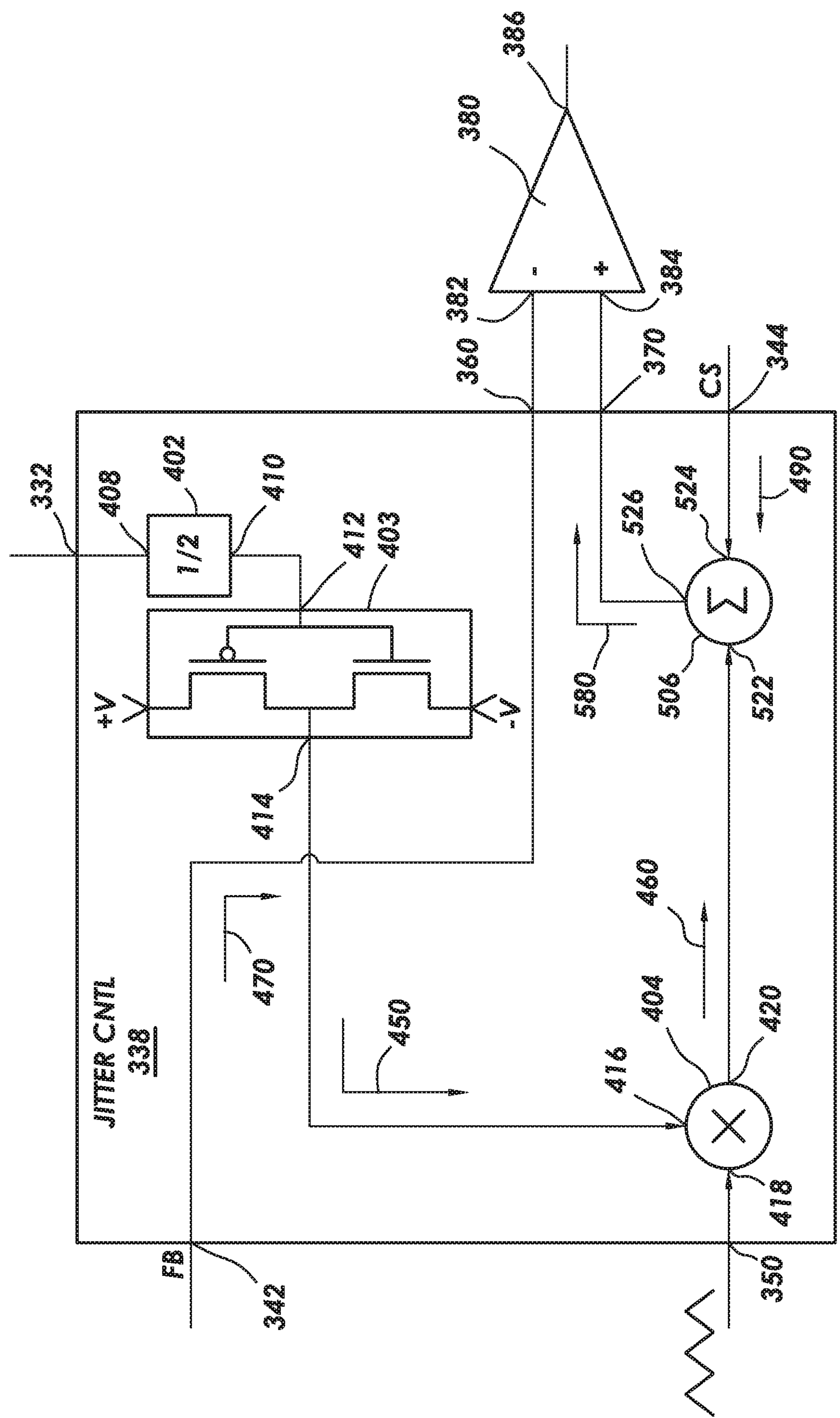
FIG. 5 shows a block diagram of a jitter controller, in accordance with at least some embodiments.

FIG. 5 shows an electrical schematic of a jitter controller 338 in accordance with at least some embodiments. In particular, FIG. 5 shows an example jitter controller 338 along with the comparator 380 to illustrate embodiments where the jitter controller 338 is configured to modify a sensed current signal with the modified jitter signal to create a dithered current signal. In particular, the example jitter controller 338 defines the pulse generator 402, the pulse signal circuit 403, and the amplitude modulation node 404.

The pulse generator 402, the pulse signal circuit 403, and the amplitude modulation node 404 are electrically coupled to each other and operate the same as those described with respect to FIG. 4, and thus the operation will not be repeated again here so as not to unduly lengthen the specification.

The example jitter controller 338 further includes a summation node 506 that defines a first input 522 coupled to the modified jitter signal output 420, a second input 524 coupled to the current sense input 344, and an output 526 defining the dithered sense output 370. In the example jitter controller 338 of FIG. 5, the current setpoint signal passes unchanged through the jitter controller 338. It follows that the current setpoint signal provided on the dithered setpoint output 360 is not dithered. However, for reasons of consistency, and for reasons that will become more clear with respect to other exampled embodiments, the output 360 is nevertheless referred to as the dithered setpoint output 360.

The example jitter controller 338 of FIG. 5 is configured to provide a dithered current signal to the comparator 380. The example jitter controller 338 amplitude modulates the pulse signal 450 to create the modified jitter signal 460. The modified jitter signal 460 is provided to the summation node 506. The summation node 506 is configured to add the modified jitter signal 460 to a sensed current signal 490 on the current sense input 344, and create a dithered current signal 580. During each charge mode, the comparator 380 compares a current setpoint signal 470 to the dithered current signal 580. When the comparator 380 senses the dithered current signal 580 crossing the current setpoint signal 470 (e.g., the dithered current signal meets the current setpoint signal), the comparator 380 asserts its compare output 386, which de-asserts the gate terminal 310 and ends the respective charge mode.

Summarizing before continuing, the example jitter controller 338 of FIG. 5 modifies the current through the primary winding during each charge mode by creating the modified jitter signal 460, and then continuously adding the modified jitter signal to the sensed current signal 490. When negative supply voltages are present and/or created within the controller 190, the embodiments of FIGS. 4 and 5 may be implemented. However, many times only positive supply voltages (relative to the ground reference for the controller 190) are present, and including power converters to create the negative supply voltages within the controller 190 (to create the pulse signal 450) may make the controller too expensive and/or too large. Thus, the specification turns to embodiments where the modified jitter signal is not actually created, but the effect is the same or substantially the same.

Figure 6:
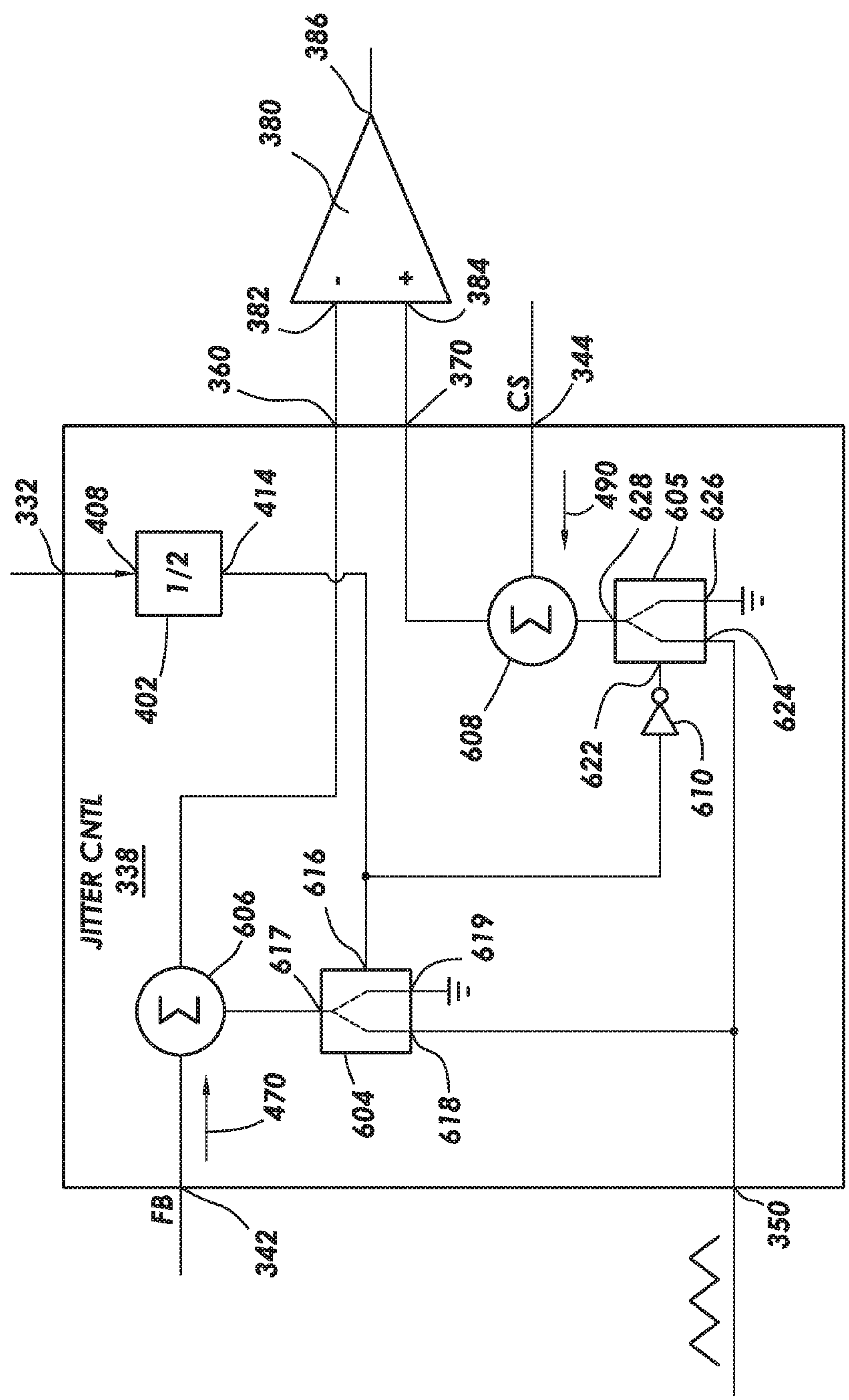
FIG. 6 show a block diagram of a jitter controller, in accordance with at least some embodiments.

FIG. 6 shows an electrical schematic of a jitter controller 338 in accordance with at least some embodiments. In particular, FIG. 6 illustrates a jitter controller 338 that alternates between adding the jitter signal to the current setpoint signal, and adding the jitter signal to the current sense signal. In this way, while the modified jitter signal of the previous embodiments is not actually created, the effect or result is the same. The jitter controller 338 defines the pulse generator 402 that operates the same as described with respect to FIG. 4, and thus the description of the pulse generator 402 and its operation will not be repeated again here so as not to unduly lengthen the specification.

The example jitter controller 338 of FIG. 6 further defines a setpoint switch 604 coupled to a setpoint summation node 606, and a current sense switch 605 coupled to a current sense summation node 608. The pulse output 414 is coupled both to a pulse input 616 of the setpoint switch 604, and a pulse input 622 of the current sense switch 605. The pulse output 414 is coupled to the control or pulse input 622 by way of an inverter 610. Accordingly, when the pulse output 414 is asserted, the setpoint switch 604 receives an asserted signal while the current sense switch 605 receives a de-asserted signal, and vice versa.

The setpoint switch 604 defines the pulse input 616, a first input 618 coupled to the jitter input 350, a second input 619 coupled to ground, and a setpoint switch output 617 coupled to the setpoint summation node 606. The example setpoint switch 604 is shown as a single pole, double throw switch, where the switch position is controlled based on the pulse input 616. One of ordinary skill in the art, with benefit of this disclosure, would understand how to create the functionality of a such single pole, double throw switch using various electrical devices (e.g., transistors, silicon controlled rectifiers), and thus the specifics of the setpoint switch 604 are not shown so as not to further complicate the description. The current sense switch 605 defines the control or pulse input 622, a first input 624 coupled to the jitter input 350, a second input 626 coupled to the ground, and a second switch output 628 coupled to the current sense summation node 608. The example current sense switch 605 is shown as a single pole, double throw switch, so as not to further complicate the discussion. The setpoint summation node 606 is coupled to the dithered setpoint output 360, while the current sense summation node 608 is coupled to the dithered sense output 370.

The example jitter controller 338 of FIG. 6, and specifically the pulse generator 402, is configured to generate a pulse signal having a pulse frequency greater than the cutoff frequency of the feedback circuit, and in example cases generates a pulse signal having a frequency that is half of the switching frequency. During a first charge mode, the pulse generator 402 asserts the pulse output 414. During the first charge mode, the setpoint switch 604 receives an asserted signal, while the current sense switch 605 receives a de-asserted signal. When a respective switch 604 or 605 receives an asserted signal, the respective switch is configured to couple the jitter signal to its respective summation node. When a respective switch 604 or 605 receives a de-asserted signal, the respective switch is configured to couple its common or output to ground.

Thus, in the first charge mode, in response to receiving an asserted signal at the pulse input 616 of the setpoint switch 604, the setpoint switch 604 couples the jitter signal at the first input 618 to the setpoint switch output 617. Thus, the jitter signal is added to the signal at the current setpoint input 342, to create a dithered setpoint signal coupled to the dithered setpoint output 360. Also during the first charge mode, the current sense switch 605 receives a de-asserted control signal, and in response the current sense switch 605 couples the ground on the second input 626 to the second switch output 628. Thus, nothing is added to the sensed current signal at the current sense input 344. It follows that the signal provided to the dithered sense output 370 in the example first charge mode is not dithered. During the example first charge mode, the comparator 380 compares the dithered setpoint signal to the sensed current signal 490 to determine when to de-assert the gate terminal 310 and end the first charge mode. That is, the first charge mode ends when the sensed current signal 490 crosses the dithered setpoint signal.

During a second, consecutive charge mode, the pulse generator 402 de-asserts a signal on the pulse output 414. During the second charge mode, the setpoint switch 604 receives the de-asserted signal, while the current sense switch 605 receives an asserted signal. In response to receiving an asserted signal at the pulse input 622 of the current sense switch 605, the current sense switch 605 couples the jitter signal at the first input 624 to the second switch output 628. Thus, the jitter signal is added to sensed current signal 490 to create a dithered current signal coupled to the dithered sense output 370. As the setpoint switch 604 received a de-asserted signal during the second charge mode, the setpoint switch 604 couples the ground on the second input 619 to the common or setpoint switch output 617. Thus, nothing is added to the signal at the current setpoint input 342. It follows that the signal provided to the dithered setpoint output 360 in the example second charge mode is not dithered. During the second charge mode, the comparator 380 compares the dithered current signal to the current setpoint signal 470 to determine when to de-assert the gate terminal 310 and end the second charge mode. That is, the second charge mode ends when the dithered current signal crosses the current setpoint signal.

The effect of operation of the example jitter controller 338 of FIG. 6 is to create a series of peak currents as shown in FIG. 2, plot 210, without having actually created the modified jitter signal 218.

Figure 7:
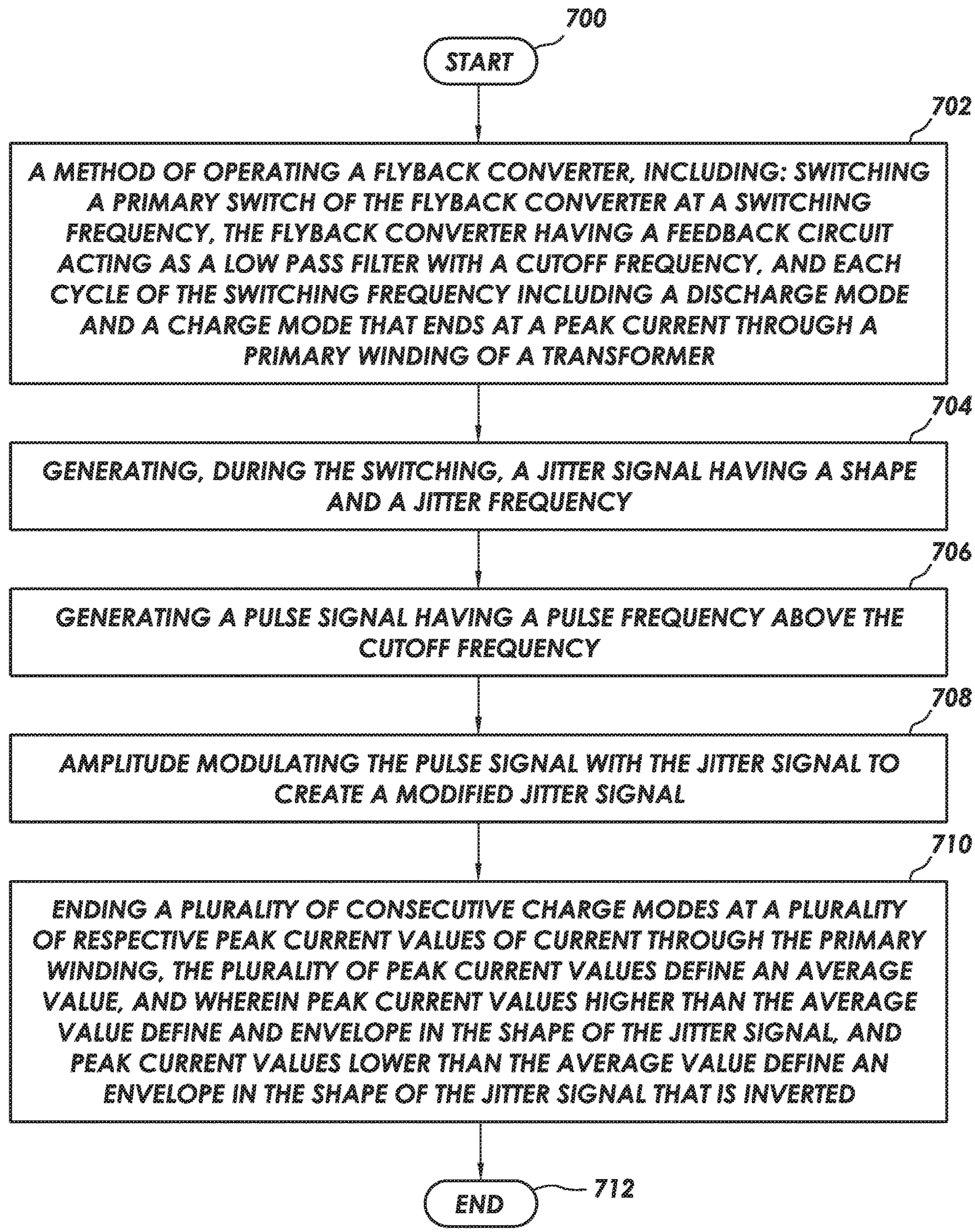
FIG. 7 shows a method in accordance with at least some embodiments.

FIG. 7 shows a method in accordance with at least some embodiments. In particular, the method starts (block 700) and includes: switching a primary switch of the flyback converter at a switching frequency, the flyback converter having a feedback circuit acting as (e.g., implementing) a low pass filter with a cutoff frequency, and each cycle of the switching frequency including a discharge mode and a charge mode that ends at a peak current through a primary winding of a transformer (block 702); generating, during the switching, a jitter signal having a shape and a jitter frequency (block 704) (e.g., the jitter frequency below the cutoff frequency of the feedback circuit); generating a pulse signal having a pulse frequency above the cutoff frequency of the feedback circuit (block 706); amplitude modulating the pulse signal with the jitter signal to create a modified jitter signal (block 708); ending a plurality of consecutive charge modes at a plurality of respective peak current values of current through the primary winding, the plurality of peak current values define an average value, and wherein peak current values higher than the average value define an envelope in the shape of the jitter signal, and peak current values lower than the average value define an envelope in the shape of the jitter signal that is inverted (block 710). Thereafter, the method ends (block 712).

The above discussion is meant to be illustrative of the principles and various embodiments of the present invention. Numerous variations and modifications will become apparent to those skilled in the art once the above disclosure is fully appreciated. For example, the jitter controller 338 is coupled to both the FB terminal and the CS terminals. It is intended that the following claims be interpreted to embrace all such variations and modifications.

The invention claimed is:

1. A method of operating a flyback converter, comprising:

switching a primary switch of the flyback converter at a switching frequency, the flyback converter having a feedback circuit acting as a low pass filter with a cutoff frequency, and each cycle of the switching frequency comprising a charge mode that ends at a peak current through a primary winding of a transformer and a discharge mode;

generating, during the switching, a jitter signal having a shape and a jitter frequency; and ending a plurality of consecutive charge modes at a respective plurality of peak current values of current through the primary winding, the plurality of peak current values define an average value, and wherein peak current values higher than the average value define an envelope in the shape of the jitter signal, and peak current values lower than the average value define an envelope in the shape of the jitter signal that is inverted.

2. The method of claim 1 wherein ending the plurality of consecutive charge modes further comprises:

sensing current through the primary winding to create a sensed current signal;

generating a pulse signal having a pulse frequency above the cutoff frequency;

adding the jitter signal to the sensed current signal when the pulse signal is asserted to create a dithered current signal;

when the pulse signal is asserted, ending at least some charge modes when the dithered current signal meets the current setpoint signal;

adding the jitter signal to a current setpoint signal when the pulse signal is de-asserted to create a dithered setpoint signal; and when the pulse signal is de-asserted, ending at least some charge modes when the sensed current signal meets the dithered setpoint signal.

3. The method of claim 2 wherein the pulse frequency is half the switching frequency.

4. The method of claim 1 wherein ending each charge mode further comprises:

sensing current through the primary winding to create a sensed current signal;

generating a pulse signal having positive peaks and negative peaks, the pulse signal having a pulse frequency above the cutoff frequency of the feedback circuit;

amplitude modulating the pulse signal with the jitter signal to create a modified jitter signal;

adding the modified jitter signal to the sensed current signal to create a dithered current signal; and ending each charge mode when the dithered current signal meets a current setpoint signal.

5. The method of claim 4 wherein the pulse frequency is half the switching frequency.

6. The method of claim 1 wherein ending each charge mode further comprises:

sensing current through the primary winding to create a sensed current signal;

generating a pulse signal having positive peaks and negative peaks, the pulse signal having a pulse frequency above the cutoff frequency of the feedback circuit;

amplitude modulating the pulse signal with the jitter signal to create a modified jitter signal, adding the modified jitter signal to a current setpoint signal to create a dithered setpoint signal; and ending each charge mode when the sensed current signal meets the dithered setpoint signal.

7. The method of claim 6 wherein the pulse frequency is half the switching frequency.

8. The method of claim 1 wherein ending each charge mode further comprises:

sensing current through the primary winding to create a sensed current signal;

generating a pulse signal having a pulse frequency above the cutoff frequency of the feedback circuit;

creating a dithered current signal by adding the jitter signal to the sensed current signal when the pulse signal is asserted, and subtracting the jitter signal from the sensed current signal when the pulse signal is de-asserted; and ending each charge mode when the dithered current signal meets a current setpoint signal.

9. The method of claim 8 wherein the pulse frequency is half the switching frequency.

10. A packaged integrated circuit (IC) for controlling a primary side of a flyback converter, the packaged IC comprising:

a gate terminal, a current sense terminal, a voltage sense terminal, and a feedback terminal;

a start controller defining a sense input coupled to the voltage sense terminal, and a start output;

a latch circuit defining a latch input coupled to the start output, a reset input, and a drive output coupled to the gate terminal;

an end controller defining a feedback input coupled to the feedback terminal, a current sense input coupled to the current sense terminal, a gate input coupled to the drive output, and a reset output coupled to the reset input of the latch circuit;

the start controller configured to assert the gate terminal at a switching frequency to create a plurality of consecutive charge modes;

the end controller configured to generate a jitter signal having a shape and a jitter frequency;

the end controller further configured to end the plurality of consecutive charge modes by de-assertion of the gate terminal at a respective plurality of sensed current signals, the plurality of sensed current signals sensed by way of the current sense terminal, and wherein the plurality of sensed current signals define an average value with sensed current signals higher than the average value defining an envelope in the shape of the jitter signal, and sensed current signals lower than the average value defining an envelope in the shape of the jitter signal that is inverted.

11. The packaged IC of claim 10 wherein the end controller further comprises:

a jitter signal circuit defining a jitter output, the jitter signal circuit configured to drive the jitter signal with the shape and the jitter frequency onto the jitter output;

a jitter controller defining the gate input, a current setpoint input coupled to the feedback terminal, a jitter input coupled to the jitter output, a current sense input coupled to the current sense terminal, a dithered setpoint output, and a dithered sense output;

a comparator defining a first input coupled to the dithered setpoint output, a second input coupled to the dithered sense output, and a compare output coupled to the reset output;

wherein the jitter controller is configured to at least one selected from the group comprising: modify the plurality of sensed current values with the jitter signal; modify a current setpoint signal on the current setpoint input with the jitter signal; and modify the plurality of sensed current values with the jitter signal in a first charge mode, and modify the current setpoint signal in a second, consecutive charge mode.

12. The packaged IC of claim 10 wherein the end controller further comprises:

a jitter signal circuit defining a jitter output, the jitter signal circuit configured to drive the jitter signal with the shape and the jitter frequency onto the jitter output;

a jitter controller defining the gate input, a current setpoint input coupled to the feedback terminal, a jitter input coupled to the jitter output, a current sense input coupled to the current sense terminal, a dithered setpoint output, and a dithered sense output;

a comparator defining a first input coupled to the dithered setpoint output, a second input coupled to the dithered sense output, and a compare output coupled to the reset output;

the jitter controller is configured to:

generate a pulse signal having a pulse frequency lower than the switching frequency, the generation based on a gate signal on the gate input;

add the jitter signal to a sensed current signal on the current sense input when the pulse signal is asserted to create a dithered current signal; and add the jitter signal to a current setpoint signal on the feedback input when the pulse signal is de-asserted to create a dithered setpoint signal.

13. The packaged IC of claim 12 wherein the jitter signal is a triangle wave.

14. The packaged IC of claim 10 wherein the end controller further comprises:

a jitter signal circuit defining a jitter output, the jitter signal circuit configured to drive the jitter signal with the shape and the jitter frequency onto the jitter output;

a jitter controller defining the gate input, a current setpoint input coupled to the feedback terminal, a jitter input coupled to the jitter output, a current sense input coupled to the current sense terminal, a dithered setpoint output, and a dithered sense output;

a comparator defining a first input coupled to the dithered setpoint output, a second input coupled to the dithered sense output, and a compare output coupled to the reset output;

the jitter controller is configured to:

generate a pulse signal having a pulse frequency lower than the switching frequency, the generation based on a gate signal on the gate input;

amplitude modulate the pulse signal with the jitter signal to create a modified jitter signal; and add the modified jitter signal to a sensed current signal on the current sense input to create a dithered current signal.

15. The packaged IC of claim 10 wherein the end controller further comprises:

a jitter signal circuit defining a jitter output, the jitter signal circuit configured to drive the jitter signal with the shape and the jitter frequency onto the jitter output;

a jitter controller defining the gate input, a current setpoint input coupled to the feedback terminal, a jitter input coupled to the jitter output, a current sense input coupled to the current sense terminal, a dithered setpoint output, and a dithered sense output;

a comparator defining a first input coupled to the dithered setpoint output, a second input coupled to the dithered sense output, and a compare output coupled to the reset output;

the jitter controller is configured to:

generate a pulse signal having a pulse frequency lower than the switching frequency, the generation based on a gate signal on the gate input;

amplitude modulate the pulse signal with the jitter signal to create a modified jitter signal; and add the modified jitter signal to a current setpoint signal on the feedback input to create a dithered setpoint signal.

16. The packaged IC of claim 10 wherein the end controller further comprises:

a jitter signal circuit defining a jitter output, the jitter signal circuit configured to drive the jitter signal with the shape and the jitter frequency onto the jitter output;

a jitter controller defining the gate input, a current setpoint input coupled to the feedback terminal, a jitter input coupled to the jitter output, a current sense input coupled to the current sense terminal, a dithered setpoint output, and a dithered sense output;

a comparator defining a first input coupled to the dithered setpoint output, a second input coupled to the dithered sense output, and a compare output coupled to the reset output;

the jitter controller is configured to:

generate a pulse signal having a pulse frequency lower than the switching frequency, the generation based on a gate signal on the gate input;

create a dithered current signal on the dithered sense output by adding the jitter signal to a sensed current signal on the current sense input when the pulse signal is asserted, and subtracting the jitter signal from the sensed current signal when the pulse signal is de-asserted.

17. A flyback converter comprising:

a primary-side comprising:

a primary winding of a transformer;

an auxiliary winding of the transformer;

a primary field effect transistor (FET) coupled to the primary winding, the primary FET having a gate;

a sense resistor coupled between the primary FET and ground;

a primary-side controller defining a gate terminal, a current sense terminal, a voltage sense terminal, and a feedback terminal, the gate terminal coupled to the gate, the current sense terminal coupled to a sense node defined between the primary FET and the sense resistor, and the voltage sense terminal coupled to the auxiliary winding;

a secondary-side comprising:

a secondary-side rectifier;

a secondary winding of the transformer coupled to the secondary-side rectifier, the secondary winding arranged for flyback operation;

a feedback circuit coupled to an output node of the flyback converter, and also coupled to the feedback terminal of the primary-side controller, the feedback circuit implements a low pass filter with a cutoff frequency;

wherein the primary-side controller is configured to:

switch the primary FET at a switching frequency, with each cycle of the switching frequency comprising a discharge mode and a charge mode that ends at a peak current through the primary winding;

generate a jitter signal having a shape and a jitter frequency; and end a plurality of consecutive charge modes at a plurality of respective peak current values, the plurality of peak current values define an average value, and wherein peak current values higher than the average value define an envelope in the shape of the jitter signal, and peak current values lower than the average value define an envelope in the shape of the jitter signal that is inverted.

18. The flyback converter of claim 17 wherein when the primary-side controller ends the plurality of consecutive charge modes, the primary-side controller is configured to:

sense current through the primary winding to create a sensed current signal;

generate a pulse signal having a pulse frequency greater than the cutoff frequency of the feedback circuit;

add the jitter signal to the sensed current signal when the pulse signal is asserted to create a dithered current signal;

add the jitter signal to a current setpoint signal when the pulse signal is de-asserted to create a dithered setpoint signal;

when the pulse signal is asserted, end at least some charge modes when the dithered current signal meets the current setpoint signal; and when the pulse signal is de-asserted, end at least some charged modes when the sensed current signal meets the dithered setpoint signal.

19. The flyback converter of claim 17 wherein the primary-side controller further comprises:

a start controller defining a sense input coupled to the voltage sense terminal, and a start output;

a latch circuit defining a latch input coupled to the start output, a reset input, and a drive output coupled to the gate terminal;

an end controller defining a feedback input coupled to the feedback terminal, a current sense input coupled to the current sense terminal, a gate input coupled to the drive output, and a reset output coupled to the reset input of the latch circuit;

the start controller configured to assert the gate terminal at the switching frequency to create a plurality of consecutive charge modes;

the end controller configured to generate the jitter signal;

the end controller further configured to end the plurality of consecutive charge modes by assertion of the reset output at a respective plurality of sensed current signals, the plurality of sensed current signals sensed by way of the current sense terminal, and wherein the plurality of sensed current signals define an average value with sensed current signals higher than the average value defining an envelope in the shape of the jitter signal, and sensed current signals lower than the average value defining an envelope in the shape of the jitter signal that is inverted.

20. The flyback converter of claim 17, wherein when the primary-side controller ends the plurality of consecutive charge modes, the primary-side controller is further configured to:

sense current through the primary winding to create a sensed current signal;

generate a pulse signal having a pulse frequency greater than the cutoff frequency of the feedback circuit; and create a dithered current signal by adding the jitter signal to the sensed current signal when the pulse signal is asserted, and subtract the jitter signal from the sensed current signal when the pulse signal is de-asserted.

* * * * *